United States Patent [19]

Harootion

[11] 4,452,105
[45] Jun. 5, 1984

[54] SELF-FEEDING CABLE STRIPPER

[75] Inventor: Aramais Harootion, Northridge, Calif.

[73] Assignee: Whittaker Corporation, Los Angeles, Calif.

[21] Appl. No.: 439,102

[22] Filed: Nov. 4, 1982

[51] Int. Cl.³ .............................................. H02G 1/12
[52] U.S. Cl. .................................... 81/9.5 R; 30/90.1
[58] Field of Search ............................ 81/9.5 R, 9.51; 30/90.1

[56] References Cited

U.S. PATENT DOCUMENTS 4,203,333  5/1980  Campari ............................... 30/90.1

Primary Examiner—Roscoe V. Parker
Attorney, Agent, or Firm—Donald E. Nist

[57] ABSTRACT

An improved self-feeding cable stripper is provided which has a base, preferably divided into two parts clampable together about a cable opening extending up through the base. The stripper also includes a cylinder bearing external threads, the cylinder being secured to the top of the base and also having a central cable-receiving opening extending therethrough and aligned with the base opening. A fitting bearing internal threads is threadably secured over the cylinder, the threads being arranged such that when the fitting approximates the base, the threads disengage so that the fitting turns freely on the cylinder. A cutter is mounted in the fitting and extends into a central cable-receiving opening in the fitting, which opening is aligned with the cylinder opening. The cutter has an adjustable blade for cutting sheathing of a cable, clamped in the base and extending up through all of the openings, when the fitting is screwed down on the cylinder. The cable sheathing is cut in a spiral pattern until the threads disengage, whereupon the cutter cuts a square edge on the sheathing. In one embodiment the cylinder threads are vertically interrupted to define a space for passage of waste cable sheathing particles without abrading the threads. For similar purposes a protector blade and washer may be secured to the fitting and overlie the cylinder. The lower end of the cylinder may also be notched to provide a cleaning area for removal of cable sheathing debris.

10 Claims, 2 Drawing Figures

SELF-FEEDING CABLE STRIPPER

BACKGROUND OF THE INVENTION

1. Field of the Invention

The present invention generally relates to cutting devices and more particularly relates to a self-feeding cable stripper.

2. Prior Art

A hand feed stripper is currently in use to remove metal sheathing material from mineral oxide insulated cables and other insulated cables. Such a device has no feed control mechanism, and accordingly, the cutting blade used in the stripper frequently breaks because the corrosion resistant steel surface work hardens during machining unless a somewhat controlled amount of material is removed with each pass of the cutting blade. This hand stripper unfortunately does not have any means for regulating the amount of sheathing removed during each turn of the stripper. The thickness of the material removed is dependent upon the pressure asserted by the operator on the tool. This in most cases results in rapid breaking down of the edge of the cutting tool and consequent binding and twisting of the cable and the wires enclosed therein. High technology, expensive, carefully produced cable which is used for special electronic purposes must be carefully peeled or stripped of sheathing at selected intervals without damage to the cable. This has not been regularly possible using the currently available hand feed stripper.

Accordingly, there is a need for a cable stripper to remove in an improved manner metal sheathing from cable without damage to the cable or the stripper and with full control and regulation of the amount of sheathing so removed. The stripper should not bind against the cable and the cable should be firmly held so that it does not twist or break. The cutting blade of the stripper should remain unbroken and fully effective over an extended period of time. The stripper should be capable of being rapidly and easily assembled and disassembled and preferably avoid wear from cable sheathing debris generated during the stripping operation.

SUMMARY OF THE INVENTION

The improved self-feeding cable stripper of the present invention satisfies all the foregoing needs. The stripper is substantially as set forth in the Abstract above. Thus, it comprises, in combination, a base, a cylinder secured to and projecting up from the base, a fitting threaded over the cylinder and a cutter disposed in the fitting. The base and cylinder have aligned, central cable-receiving openings; the cutter is mounted in the fitting for rotation therewith and has a cutter blade adjustably extendable into an opening in the fitting aligned with the cylinder opening.

The fitting is threaded over the cylinder in such a manner that as the fitting approaches the base, the threads disengage so that the fitting turns freely around the cylinder. This enables the cutter to square the exposed edge of the cable sheathing which has not been stripped from the cable. Spirally screwing the fitting down on the cylinder causes the spiral stripping of sheathing from the cable without binding of the cable and without damage to the cable or the blade.

The base adjustably clamps the cable in place in the stripper to control the amount of sheathing to be removed by the stripper. Cables of various diameters can be stripped and the cutter blade can be adjusted to accommodate such diameters and various cable sheathing thicknesses. A vertical gap in the threads of the cylinder permits cable sheathing debris to pass down between the cylinder and fitting without damaging the threads. A space in the area where the cylinder is joined to the base permits easy cleaning of the device. Various other features of the present invention are as set forth in the following description and accompanying drawings.

DRAWINGS

FIG. 1 is a schematic front elevation, partly broken away, of a preferred embodiment of the improved self-feeding cable stripper of the present invention, shown with a cable clamped therein and ready to be stripped; and, FIG. 2 is a schematic side elevation illustrating the base and attached cylinder portion of the cable stripper of FIG. 1.

DETAILED DESCRIPTION

Figure 1:
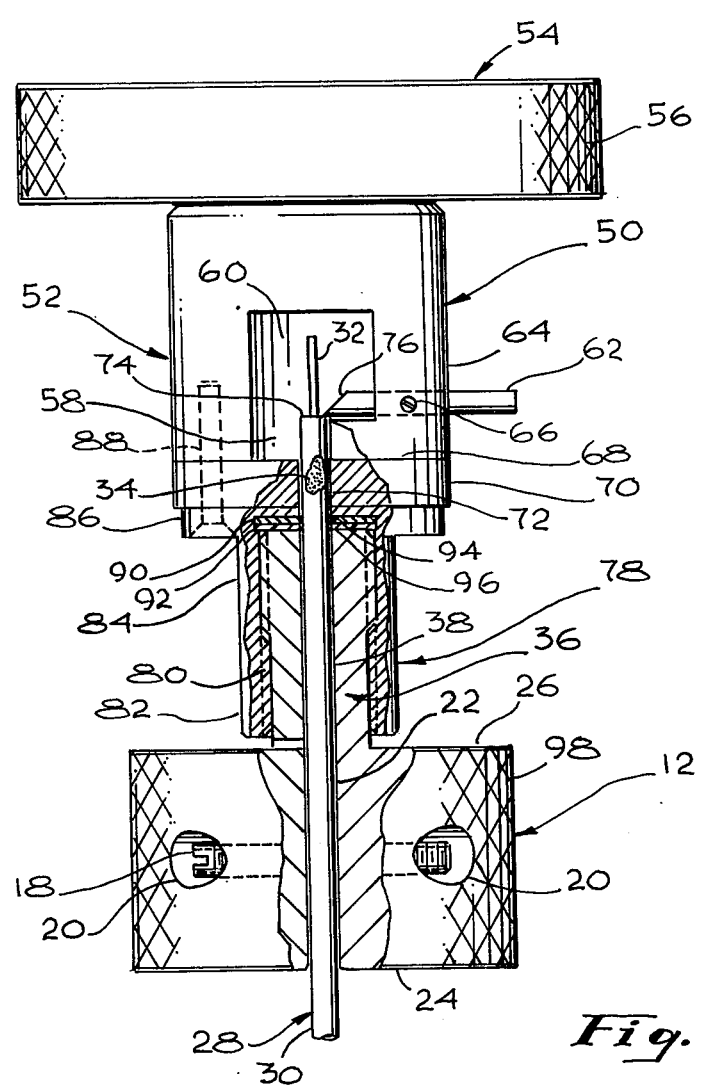
Figure 2:
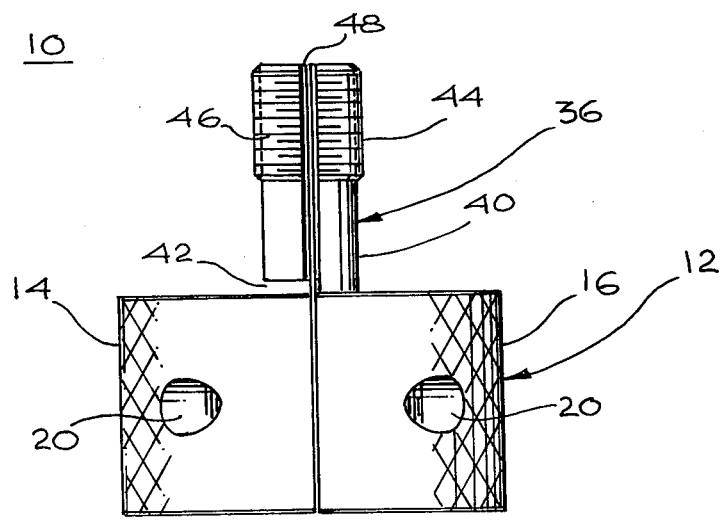

FIGS. 1 and 2

A preferred embodiment of the improved self-feeding cable stripper of the present invention is schematically depicted in FIGS. 1 and 2 of the accompanying drawings. Thus, stripper 10 is shown and comprises a base 12 which is preferably cylindrical and vertically split into two halves 14 and 16, releasably joined together by screws 18 in openings 20. Halves 14 and 16 collectively define a central vertical passageway or opening 22 extending from the lower end 24 thereof to the upper end 26 thereof. A cable 28 such as is shown in FIG. 1 can be vertically disposed in opening 22 and can be releasably clamped in place in halves 14 and 16 by screws 18. Thus, halves 14 and 16 are adapted to accommodate cables 28 of various diameters.

Cable 28 may comprise an outer cylindrical, metallic sheath 30 and one or more wires 32 separated from each other and held in position by compacted insulation such as a mineral oxide 34.

Stripper 10 also includes a vertical cylinder 36 having a central opening 38 extending the length thereof and aligned with opening 22 of base 12. In FIG. 1, opening 38 is shown receiving a portion of cable 28 which extends up therethrough. Cylinder 36 is connected to the upper end 26 of base 12 and includes a lower portion 40 which does not bear any threads but which has a cut away area 42 for removal of metal sheathing debris generated during stripping operations conducted by stripper 10 on cable 28.

The upper portion 44 of cylinder 36 bears on its outer surface external threading 46 which is provided with a vertical gap or groove 48. Groove 48 extends down through lower portion 40 into contact with the cut away area 42 for transfer of sheathing debris down thereto without injury to threads 46.

A fitting 50 is threadably secured down over cylinder 36 as shown in FIG. 1. Fitting 50 comprises a main generally cylindrical body 52 to the upper end of which is attached an enlarged cylindrical wheel 54 having a knurled outer perimeter 56. Body 52 has a central opening 58 extending up therethrough which is expanded to provide a chamber 60. A cutter blade 62 is slideably received through an opening in sidewall 64 of body 52 and extends horizontally into chamber 60. The position of blade 62 in chamber 60 is controlled by a set screw 66 which extends through sidewall 64 into contact with blade 62. Chamber 60 may be open through sidewall 64 to permit easy removal of sheathing debris therefrom.

The lower end 68 of body 52 receives a plate 70 bearing a central opening 72 therein, which is in line with opening 38, and receives the upper portion of cable 28. The upper end 74 of cable 28 is positioned against the cutting edge 76 of blade 62 as shown in FIG. 1. Fitting 50 also includes a lower cylinder 78 having internal threads 80 in the lower portion 82 thereof, the upper portion 84 thereof being unthreaded. Cylinder 78 has an upper expanded portion 86 connected to the lower end of plate 70 by screws 88 passing up through portion 86 and plate 70 into body 52.

Portion 82 is separated from portion 84 of cylinder 78 by metallic washer 90 and plastic washer 92, as shown in FIG. 1. Washers 90 and 92 prevent debris from sheathing 30 from passing down through the aligned openings in cylinders 78 and 36. Washers 90 and 92 are removable and have aligned central openings 94 and 96, respectively through which cable 28 is tightly received.

It will be understood that base 12 may have knurling 98 on its outer surface to facilitate easy relative rotation of base 12 and fitting 50 during the stripping operation carried out by stripper 10 on cable 28, due to the action of cutter blade 62, specifically cutting edge 76.

In utilizing stripper 10, base halves 14 and 16 are first loosened by screws 18 and cable 28 is inserted up through openings 20 and 38. Assembled fitting 50 is then threaded onto the upper threaded portion 44 of cylinder 36 and cable 28 is moved up into contact with cutting edge 76. The exact position of edge 76 is adjusted by set screw 66. Halves 14 and 16 are then clamped by screws 18 to hold cable 28 firmly in place without damaging it. Fitting 50 then rotated relative to base 12 so that cutter edge 76 spirals down sheathing 30, removing sheathing 30 in a continuous, narrow spiral strip until threaded portion 82 passes below threaded portion 44, whereupon the threads thereof disengage and fitting 50 freely turns immediately above upper end 26 of base 12 so that cutting edge 76 squares off the upper leading edge 74 of sheathing 30. Thus removal of sheathing 30 is completed in a controlled, effective, rapid manner. Fine particles of sheathing debris are easily removed from chamber 60 and any such particles which migrate to the area between cylinders 36 and 78 pass down groove 48 to the area 42 from which they are easily removed without damage to the threading of cylinders 36 and 78. Such debris cannot pass through the central openings in cylinders 36 and 78 because of the blocking action of washers 99 and 92.

After stripping operation is completed, preferably fitting 50 is rotated up relative to base 12 to disengage from base 12; screws 18 are loosened so that cable 28 can be removed therefrom. It will be understood that an opening 98 aligned with central opening 38 is provided in fitting body 52 into which the upper end 74 of sheathing 30 passes during the stripping operation.

Stripper 10 can be readily disassembled for cleaning and can be readily reused for additional stripping operations. The length and depth of the stripping can be easily controlled; cutting edge 76 does not bind upon sheathing 30 and does not break and cable 28 does not twist or bend during the stripping so that it remains totally undamaged. It takes only a few seconds to assemble stripper 10 with cable 28 therein, carry out the stripping operation described above and remove cable 28 from stripper 10.

Stripper 10 can be fabricated of conventional, durable, inexpensive metallic components and the like in a variety of shapes and sizes. It accommodates various cable diameters and lengths and various sheathing thicknesses.

Various modifications, changes, alterations and additions can be made in the improved stripper of the present invention, its components and their parameters. All such modifications, changes, alterations and additions as are within the scope of the appended claims form part of the present invention.

What is claimed is:

1. An improved self-feeding cable stripper, said stripper comprising, in combination:
   a. a base having a cable-receiving opening extending therethrough and clamping means for adjustably clamping a cable in said opening;
   b. a cylinder secured to and projecting from said base, said cylinder having a central cable-receiving opening aligned with said base opening, the exterior surface of said cylinder bearing threads on the distal portion thereof;
   c. a fitting threadably secured to said cylinder so as to disengage from said threads when said fitting approximates said base, said fitting having a central cable-receiving opening aligned with said cylinder opening; and,
   d. a cutter mounted in said fitting for rotation therewith, said cutter including a cutter blade adjustably intersecting said fitting opening for cutting sheathing of a cable, when in said openings in a spiral pattern as said cutter is rotated toward said base, and in a squared edge pattern when said fitting is rotated around and disengages from said cylinder adjacent said base.

2. The improved self-feeding cable stripper of claim 1 wherein said cylinder threads are interrupted to provide a space for passage of waste cable sheathing particles without thread abrasion.

3. The improved self-feeding cable stripper of claim 2 wherein said cylinder and space are vertical and wherein said cutter is disposed above said cylinder.

4. The improved self-feeding cable stripper of claim 3 wherein a protector plate and washer are secured to said fitting and overlie said cylinder to protect said cylinder from cable sheathing particles.

5. The improved self-feeding cable stripper of claim 4 wherein said base is vertically split through said opening into two equal halves, and wherein the lower end of said cylinder is notched to provide a cleaning area for removal of cable sheathing debris.

6. The improved self-feeding cable stripper of claim 5 wherein said base and fitting are expanded and knurled on their outer peripheries to facilitate relative rotation thereof during cutting of cable sheathing.

7. The improved self-feeding cable stripper of claim 6 wherein said cutter blade is adjustably secured in said fitting by one or more set screws and wherein said cable stripper comprises metallic removable components.

8. The improved self-feeding cable stripper of claim 7 wherein said fitting includes a transverse opening through the sidewall thereof extending from the point of intersection of said cutter blade and said central fitting opening, for removal of sheathing debris and alignment of said cutter blade.

9. The improved self-feeding cable stripper of claim 8 wherein said fitting comprises a main body having said transverse opening, wherein said protector plate is secured to the bottom of said main body and wherein said fitting includes a lower hollow tubular depending component secured to the bottom of said protector plate and having internal threads in the lower portion thereof.

10. The improved self-feeding cable stripper of claim 9 wherein said cylinder has threads on the exterior surface of the upper portion thereof engageable with said threads of said depending component when the latter is disposed therearound and wherein said washer is disposed in the upper portion of said depending component.

* * * * *